Aug. 5, 1958   R. A. FINDLAY   2,846,427
TREATMENT OF POLYMERS
Filed March 14, 1957
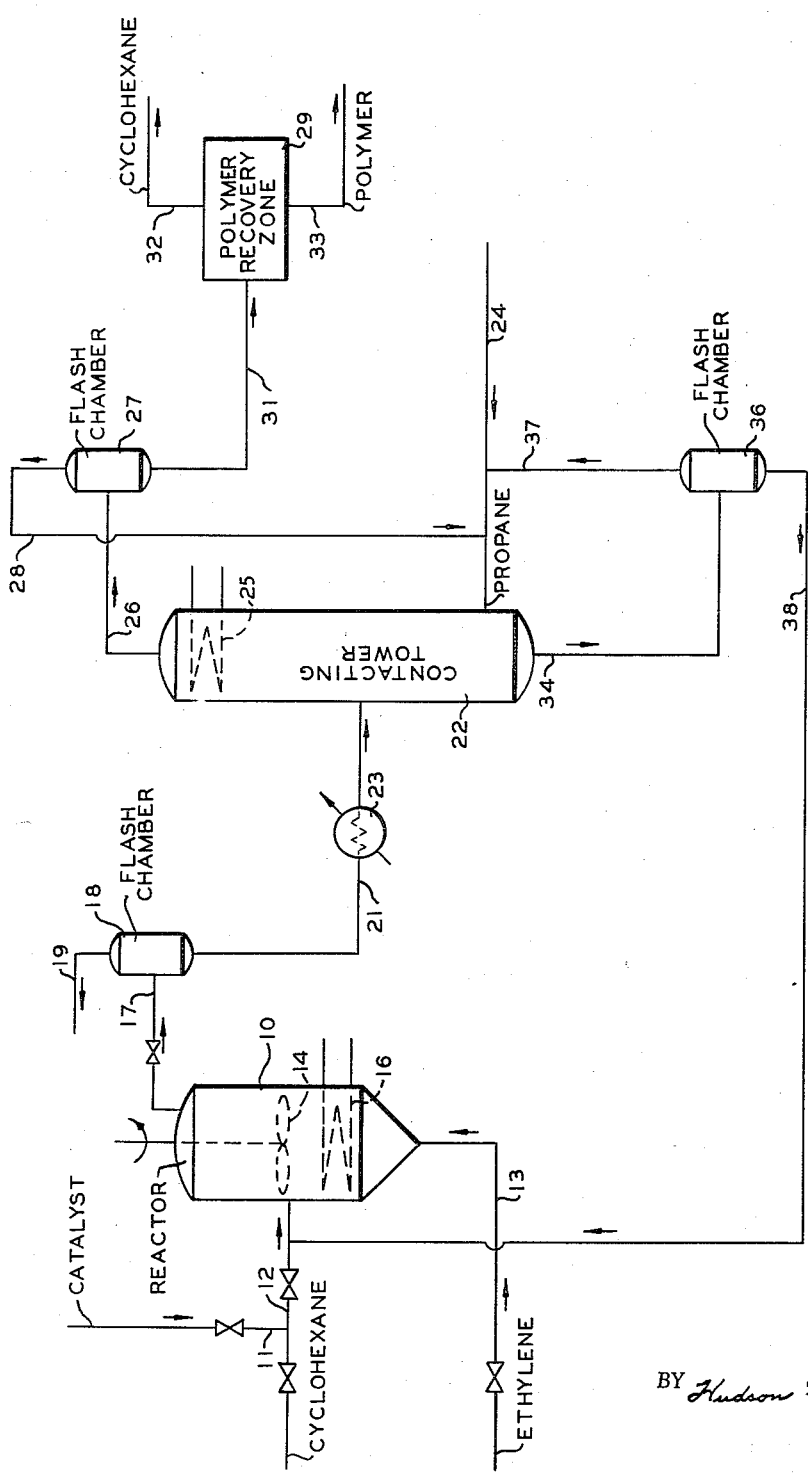
INVENTOR.
R.A. FINDLAY
BY Hudson and Young
ATTORNEYS United States Patent Office 2,846,427
Patented Aug. 5, 1958

2,846,427

TREATMENT OF POLYMERS

Robert A. Findlay, Bartlesville, Okla., assignor to Phillips Petroleum Company, a corporation of Delaware Application March 14, 1957, Serial No. 646,005

20 Claims. (Cl. 260—94.9)

This invention relates to polymers and methods for their production. In one aspect, it relates to a method for producing polymers having a low ash content and a desirable color. In another aspect, it relates to a method for treating polymer solutions so as to substantially reduce the ash content of the polymer.

The product obtained when producing olefin polymers by catalytic polymerization often has a tan or brown color and/or a high ash content. Various methods are described in the literature for overcoming one or both of these problems. For example, one method proposes washing the solid polymer with water, alcohol, acids or caustic solution in order to remove bound metal portions of the catalyst. Such treatment may produce a white polymer, but it has been found that the yellow or tan color returns when the polymer is subjected to a molding or heating operation. Furthermore, this method of treatment fails to produce a polymer having a desirably low ash content.

Still other treating methods have been advanced but the same difficulties as regards color and ash content are present. In one method, the solid polymer is shaken with methanol, extracted with hydrochloric acid and then with acetone. Another method involves treating the solid polymer with dilute acids, e. g., 10 to 15 percent hydrochloric acid, with the addition of organic solvents, such as ether or alcohol. In still another method, the solid polymer is washed with methanol and then treated with dilute nitric acid at about 100° C. Polymers of undesirably high ash content are produced by each method, and the undesirable tan or yellow color reappears when the material is subjected to heat even though the material before such heating may be white.

For many uses, polymers of high ash content are very undesirable because the ash contributes to poor electric properties, e. g., conductivity, dielectric constant, dissipation factor, and the like. The reappearance of the tan or yellow color upon molding is, of course, obviously a very undesirable feature. For some applications, low ash content is of paramount importance while for other purposes the color is of primary significance. There are, of course, some uses which require both a snow white color and a low ash content.

It is, therefore, an object of the present invention to provide an improved method of reducing the ash content of polymers wherein the color of the polymer, after being subjected to a molding operation, is greatly improved as compared to prior molded products.

Another object of the invention is to provide a method for treating polymer solutions in order to remove catalyst associated therewith.

A further object of the invention is to provide a system for treating solid polymers.

A still further object of the invention is to provide a process for polymerizing olefins wherein catalyst recovered from a polymer solution is recycled to a polymerization zone, thereby resulting in improved productivity.

Various other objects, advantages and features of the invention will become apparent to one skilled in the art upon consideration of the accompanying disclosure.

The instant invention resides in a process which eliminates or substantially minimizes the above-discussed problems with a resulting production of polymers of low ash content and/or having a desired white color which is retained even after the polymer is subjected to a molding operation. Broadly speaking, the process comprises contacting a polymer in solution in a hydrocarbon solvent with a light hydrocarbon having a boiling point lower than that of the hydrocarbon solvent, and separately recovering a catalyst-rich phase and a polymer-rich phase. The treating operation is preferably carried out in a contacting tower, the upper portion of which is maintained at a higher temperature, e. g., 50 to 100° F. higher, than its lower portion. This treating operation results in a very substantial reduction in the ash content of the polymer. Furthermore, the polymer which is recovered from the polymer-rich phase has an improved color which is retained even when the polymer is subjected to a molding operation.

A more comprehensive understanding of the invention can be obtained by referring to the drawing which is a flow diagram illustrating a preferred embodiment of the invention. In the description, the conditions are set forth which are suitable for the treatment of polyethylene in accordance with the invention. However, it will be understood that these conditions will vary somewhat depending upon the material treated, the nature of the catalyst used and other operating conditions. Such variations will be apparent to those skilled in the art.

Referring now to the drawing, a catalyst charge comprising equal parts of triisobutylaluminum and titanium tetrachloride in cyclohexane is charged to reactor 10 through lines 11 and 12. Although the cyclohexane and catalyst are shown as entering the reactor together, it is within the scope of the invention to introduce these materials separately into the reactor. Ethylene is introduced into the lower portion of the reactor 10 through line 13. The reactant materials are charged to the reactor at a rate such as to provide a reactor effluent stream containing about 6.0 percent by weight polyethylene, based on the total effluent. While the concentration of the polymer in the effluent can vary within rather wide limits, it should be maintained below 20 weight percent in order to prevent the effluent from becoming too viscous for subsequent treating. However, if the reactor effluent contains more than the desired concentration of polymer, it can be further diluted by addition of cyclohexane prior to being treated by the process of this invention. With certain polymers, e. g., those having a relatively low molecular weight, a polymer concentration as high as 25 percent can be readily employed. The amount of catalyst charged is 1 percent by weight, based on the total reaction mixture. Although any amount of catalyst can be used which is sufficient to provide the desired polymeric product, the amount which is normally used is in the range of 0.01 to 5 weight percent or higher, based on the total reaction mixture.

Reactor 10 is provided with a stirrer 14 driven by motor (not shown) in order to thoroughly agitate the contents of the reactor. The polymerization reaction is preferably conducted in the mixed phase, i. e., with the vessel only partially filled with liquid. Reactor 10 is also provided with a heat exchange coil 16 through which a suitable heat exchange fluid is circulated in order to maintain a desired polymerization temperature within the reactor. While in this embodiment of the invention the polymerization temperature is about 175° F., the temperature can vary over a broad range. For example, the polymerization temperature can vary from about −250° F. to 500° F., with a temperature in the range of zero to 350° F. being usually employed. The pressure in the reactor is maintained at 250 p. s. i. g. While the pressure can vary over a wide range so long as the solvent is maintained in the liquid phase, pressures in the range of 30 to 500 p. s. i. g. are usually maintained.

Reactor effluent is withdrawn from the reactor through line 17 and then passed to flash chamber 18 which is maintained at a pressure somewhat lower, e. g., 25 to 50 p. s. i. g. lower, than the pressure in reactor 10. As a result of this lowering of the pressure in the flash chamber, unreacted ethylene contained in the reactor effluent is flashed off and removed from the flash chamber through line 19. The ethylene recovered through line 19 can be recycled to line 13 for use in the polymerization process. After removal of the ethylene, the reactor effluent comprising solvent, dissolved polymer and catalyst is withdrawn from the flash chamber through line 21 and introduced into an intermediate portion of contacting tower 22.

Treatment of the polymer in contacting tower 22 takes place at a temperature at which the polymer is in solution. With ethylene polymers having molecular weight in the range of 20,000 to 150,000, temperatures between about 200° F. and about 400° F. can be advantageously employed. However, the solution temperature varies considerably with different polyethylenes and may be as low as 180° F. Furthermore the solution temperature varies considerably with different types of polymers and is not critical so long as the treatment takes place with the polymer in solution. When polymers of higher olefins are being treated, the solution temperature may be considerably lower. A heat exchanger 23 is provided in line 21 in order to ensure that the polymer is in solution upon introduction into the contacting tower.

Contacting tower 22 can be any vessel suitable for contacting liquid materials in countercurrent flow. For example, it can be a vertical cylindrical pressure vessel which is properly insulated and designed to withstand elevated pressures. Line 24 connected to the lower portion of the contacting tower provides means for introducing a light hydrocarbon into the lower portion of the tower. Any suitable light hydrocarbon, preferably a paraffinic hydrocarbon containing from 1 to 6, and more desirably containing from 2 to 5, carbon atoms per molecule, and having, in general, a boiling point substantially lower, e. g., at least 25° F. lower, than the boiling point of the solvent employed in the polymerization reaction can be used. Examples of, but not exhaustive of, such light hydrocarbons are ethane, propane, butane, isobutane, pentane, isopentane, hexane, isohexane, and the like.

The upper portion of contacting tower 22 is provided with a heating coil 25 through which a suitable heating fluid is circulated. Through the operation of the heating coil, the upper portion of the tower is maintained at a temperature higher, e. g., 50 to 100° F. higher, than the lower portion of the tower. The temperature within the tower is generally in the range of 150 to 500° F. depending upon the particular polymer undergoing treatment. The pressure in the tower is such as to maintain the materials therein in the liquid phase and will depend to a marked degree upon the light hydrocarbon used and the temperature in the tower. In general, a large volume of light hydrocarbon, e. g., up to 10 volumes of light hydrocarbon per volume of polymer solution, is employed in the contacting tower. The time of treatment can vary over a wide range, e. g., from 5 to 300 minutes, so long as there is adequate contact between the light hydrocarbon and the polymer solution.

The light hydrocarbon, such as propane, introduced into the tower through line 24 contacts the polymer solution in countercurrent flow. During this contacting operation, the catalyst is caused to precipitate and settles in the lower portion of the column. While it is not intended to limit the invention to any theory of operation, it is believed that addition of the light hydrocarbon in conjunction with the heating of the upper portion of the column causes a change in the solubility of the catalyst and polymer in the solvent and the light hydrocarbon. In other words, the addition of the light hydrocarbon reduces the solubility of the catalyst in the polymer solution, causing the catalyst to precipitate.

A polymer-rich phase is taken overhead from the contacting tower through line 26 and passed into flash chamber 27. In flash chamber 27, a pressure is maintained somewhat lower than that in contacting tower 22, thereby causing the light hydrocarbon to be flashed off. The light hydrocarbon is removed from the flash chamber through line 28 and recycled to line 24 for subsequent use in the contacting tower. Polymer in solution in cyclohexane, which is recovered from the lower portion of the flash chamber 27 through line 31, is then passed into polymer recovery zone 29. The polymer recovery zone can be any suitable means for recovering polymer from a solution thereof in a solvent and can comprise cooling and filtration equipment whereby the dissolved polymer is precipitated from solution by cooling and subsequently filtered. Cyclohexane is recovered from zone 29 through line 32 while polyethylene having a low ash content is withdrawn from the zone through line 33. The cyclohexane removed from zone 29 can be recycled to line 12 for use in the polymerization reaction.

A catalyst-rich phase comprising propane, catalyst, and polymer is withdrawn from the lower portion of contacting tower 22 through line 34. This catalyst-rich phase is then passed into flash chamber 36 which is operated at a pressure lower than that maintained in contacting tower 22. The propane is flashed overhead from flash chamber 36 through line 37 and then recycled to the contacting tower through line 24. The catalyst and polymer which is recovered from flash chamber 36 through line 38 may be recycled to line 12 for use in the polymerization reaction. A portion of the used catalyst and polymer can be removed from the system as required by means of a line (not shown) connected to line 38, and then discarded or treated for recovery of the polymer as desired. When using conventional processes as described hereinbefore to treat the polymer, the catalyst is generally deactivated and thereby rendered unsuitable for further use in the polymerization. However, the catalyst recovered in the instant process is not deactivated and can, therefore, be re-employed in the polymerization, thereby resulting in an improved productivity.

The treating process of this invention is applicable to the polymers prepared by polymerization in the presence of a catalyst comprising a hydride or organo compound, e. g., a compound of a metal selected from the group consisting of aluminum, gallium, indium, and beryllium having the valence linkages thereof individually bound to members selected from the group consisting of hydrogen, alkyl, cycloalkyl and aryl radicals. These hydrides and organo compounds are often used in admixture with certain metal compounds as will become apparent hereinafter from the description of the two or more component catalyst systems. Examples of such compounds include $Al(C_6H_5)_3$, $Al(CH_3)_3$, $HAl(C_2H_5)_2$, $H_2AlCH_3$, $Be(CH_3)_2$, $AlH_3$, $Ga(C_3H_7)_3$, $In(CH_3)_3$, $Be(C_6H_5)_2$, $Al(C_6H_{13})_3$, $Ga(C_6H_5)_3$, and the like. The instant invention is particularly applicable to the treatment of polymers prepared by polymerization in the presence of a two or more component catalyst system wherein one component is an organometal compound, including those where one or more organo groups is replaced by a halogen, a metal hydride, or a metal of groups I, II, or III, and the second component is a group IV to VI (Mendeleef's Periodic System) metal compound, e. g., a salt or alcoholate. The organometal compounds referred to include, without limitation, alkyl, cycloalkyl, or aryl compounds of di-, tri-, tetravalent metals, particularly aluminum, gallium, indium, beryllium, sodium, potassium, lithium, rubidium, cesium, magnesium, cadmium, mercury, zinc, barium, lead, and tin, or such organometal compounds where one or more of the alkyl, cycloalkyl or aryl groups is replaced by a hydrogen atom and/or a halogen atom. The organo groups can be quite large, compounds being applicable which have 15 or more carbon atoms in each alkyl, cycloalkyl or aryl group and 40 or more carbon atoms in the molecule. Specific examples of such organometal compounds include triethylaluminum, triisobutylaluminum, a mixture of diethylaluminum chloride and ethylaluminum dichloride, sometimes referred to herein as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc chloride, tetraphenyllead, tetraethyltin, and $CH_3AlCl$, $(C_4H_9)_2AlBr$, $C_8H_{17}AlI_2$, $(C_3H_7)_2GaF$, $C_6H_{11})_2GaCl$ (cyclohexane derivative), $$(C_6H_5)GaBr_2, C_{20}H_{41}GaBr_2, (C_{14}H_{29})_2GaF$$

$(C_6H_5)_2InCl$, $C_8H_{17}InF_2$, $(C_6H_{11})InBr_2$ (cyclohexane derivative), $C_{17}H_{35}BeI$, $CH_3BeBr$, and the like.

The metal hydrides can include, as specific examples, aluminum hydride, lithium aluminum hydride, barium hydride, gallium hydride, indium hydride, sodium aluminum hydride, potassium beryllium hydride.

The metals of the first, second and third groups are applicable as a class, the most important members being sodium, magnesium and aluminum.

The compounds of a metal of group IV to VI of the periodic system include the oxides, hydrides, halides, oxyhalides, and salts of organic acids, usually having twenty or less carbon atoms, such as formic acid, of the Group IV to VI metals such as titanium, zirconium, chromium, thorium, molybdenum and vanadium.

The alcoholates of a metal of group IV of the periodic system which can be employed conform to the formula $X_nM(OR)_m$, where $m+n$ equals the valence of the metal M, X is a halogen, and R is an organic radical usually having twenty or less carbon atoms, and preferably being an alkyl, cycloalkyl or aryl group. Specific examples of such alcoholates are titanium butoxide (terta-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl) titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichlorodiethyl titanate $$(Cl_2Ti(OC_2H_5)_2)$$

monochlorotriethyl titanate $(ClTi(OC_2H_5)_3)$, and dichloro diethyl zirconate $(Cl_2Zr(OC_2H_5)_2)$. Also included are such compounds as $Hf(OCH_3)_4$, $Th(OC_3H_7)_4$, $$Th(OC_6H_5)_4, Cl_3Ti(OC_6H_4OH_3), Zr(OC_4H_7)_4$$

$Cl_2Hf(OC_{10}H_{21})_2$, $Th(OC_6H_{13})_4$, and $Zr(OC_{12}H_{25})_4$.

A third catalyst component which can be used advantageously is an organic halide or metal halide where the organic radical has thirty or less carbon atoms, and is advantageously an alkyl, cycloalkyl or aryl group. Specific examples are ethyl bromide, ethyl trichloro titanium, 1-bromobenzene, cyclohexyl chloride. Also applicable are an alkali metal or ammonium halide, an aluminum halide (where the catalyst also includes another metal compound such as a titanium compound), a halogen, a hydrogen halide, a complex hydride, a mixture of an organic halide and a metal, and Grignard reagent.

A still more specific subgroup of catalysts where excellent color and low ash content are obtained by the practice of the invention include catalysts in which an organometal compound is used in combination with a metal salt. The ratios of the catalyst components can vary widely, depending upon the particular charge used and operating conditions, say from 0.02 to 50 mols of the first component per mol of the second catalyst component. If a third component is present, the amount can vary from 0.02 to 50 mols per mol of the second component.

Examples of suitable catalyst systems in accordance with the foregoing disclosure are as follows:

(a) Aluminum trialkyls, e. g., triethylaluminum or triisobutylaluminum and the tetravalent metal halides of the type represented by titanium tetrachloride;

(b) An organic halide (such as ethyl bromide), a group IV inorganic halide (such as titanium tetrachloride), and a low valence metal selected from the group consisting of alkali metals, beryllium, magnesium, zinc, cadmium, mercury, aluminum, gallium, indium, and thallium, for example, magnesium, ethyl bromide and titanium tetrachloride, as such, or with the addition of metallic aluminum;

(c) A group IV halide, for example, titanium tetrachloride, and a low valence metal identified in (b), for example, sodium or magnesium;

(d) A mixture of titanium hydride and an organometal compound exemplified by aluminum alkyl halide, i. e., a mixture of titanium hydride and ethylaluminum sesquichloride;

(e) Titanium dioxide and an organometal compound such as trialkylaluminum and aluminum alkyl chlorides, e. g., a mixture of titanium dioxide and ethylaluminum sesquichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halides exemplified by triethylaluminum and diethylaluminum chloride;

(h) A mixture of a derivative selected from the oxides of molybdenum, alkali metal and ammonium molybdates, and an organometal compound or halide exemplified by triisobutylaluminum and isobutylaluminum dichloride;

(i) A mixture of a derivative of iridium, platinum and osmium selected from the group consisting of halides, oxides and complex compounds of iridium, platinum and osmium, said complex compounds corresponding to the formula $M_xM'X_y$, wherein M is an alkali metal or an ammonium radical, M' is iridium, platinum or osmium, X is a halogen, and y is at least 1 and the sum of x and y is equal to the valence of M' and a metallic organic compound exemplified by triethylaluminum, for example, iridium chloride and triethylaluminum or ethylaluminum sesquichloride;

(j) At least one derivative selected from the group consisting of oxides, halides, and oxyhalides of vanadium and complex salts of said halides with a member selected from the group consisting of ammonium halide and an alkali metal halide, and an organometal compound exemplified by triethylaluminum, for example, vanadium oxide and triethylaluminum;

(k) A mixture of a derivative of a group VI metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia and an organometal compound exemplified by triethylaluminum, for example, molybdenum pentachloride and ethylaluminum dichloride;

(l) A chromyl halide and at least one of the following (1) a metal hydride or an organometal compound, (2) an organometal halide, and (3) a mixture of an organic halide and a metal, for example, chromyl chloride, ethyl bromide and magnesium;

(m) (1) A titanium derivative, (2) a complex hydride and (3) a halide of aluminum, for example tetrabutyl titanate, lithium aluminum hydride and aluminum chloride;

(n) At least one halide of titanium, zirconium or hafnium and at least one hydride of lithium, sodium, potassium, rubidium, cesium, magnesium, calcium, strontium, barium, lanthanum or thorium, for example zirconium tetrachloride and calcium hydride;

(o) (1) A hydrocarbon derivative of one of the metals, zinc, cadmium, mercury, and magnesium and (2) a member selected from the group consisting of halides of titanium, zirconium, vanadium, and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(p) (1) An organo derivative of a group IV-A metal, (2) a hydride or organo compound of a metal of groups II to VIII, inclusive, and (3) a member selected from the group consisting of halogens and hydrogen halides, for example, triethylaluminum, titanium butoxide, and bromine;

(q) (1) A tri- or tetrahalide or titanium, zirconium, hafnium and germanium, (2) an organophosphorus-containing compound, and (3) at least one of the following (a) an organometal halide, (b) a mixture of an organic halide and a metal and (c) a complex hydride, for example, triethylaluminum, titanium tetrachloride and triphenyl phosphine;

(r) (1) A tri- or tetrahalide of titanium, zirconium, hafnium, and germanium, (2) a peroxide of the formula R'OOR' where R' is hydrogen, alkyl, aralkyl, alkaryl, cycloalkyl, acyl, alkyne, or aryl and (3) at least one of the following: (a) an organometal halide (b) a mixture of an organic halide and a metal and (c) a complex hydride; for example, ethylaluminum sesquichloride, titanium tetrachloride and benzoyl peroxide;

(s) (1) A tri- or tetrahalide of titanium, zirconium, hafnium and germanium, (2) a metal alkoxide, and (3) at least one of the following: (a) an organometal halide, (b) a mixture of an organic halide and a metal, and (c) a complex hydride; for example, ethylaluminum sesquichloride, aluminum ethylate and titanium tetrachloride;

(t) (1) A halide of titanium, zirconium, hafnium, or germanium, (2) a hydride selected from the group consisting of hydrides of aluminum, gallium, indium and thallium and complexes of said hydrides with alkali metal hydrides and (3) an organic halide; for example, titanium tetrachloride, lithium aluminum hydride and ethyl bromide;

(u) (1) A halide of titanium, zirconium, hafnium, or germanium, (2) carbides and acetylenic compounds, and (3) at least one of the following: (a) an organometal halide, (b) a mixture of an organic halide and a free metal, and (c) a complex hydride; for example, ethylaluminum sesquichloride, titanium tetrachloride, and copper acetylide.

The materials which are polymerized, in accordance with this invention, are polymerizable hydrocarbons, broadly. Preferably, the polymerizable hydrocarbons are olefins containing a $CH_2=C<$ radical. The preferred class of polymerizable hydrocarbons used is olefins which are members of the ethylene series having up to and including eight carbon atoms per molecule. However, the polymerizable hydrocarbons used in the process of this invention also include di- and polyolefins in which the double bonds are in non-conjugated positions. Specifically, ethylene has been found to polymerize to a solid polymer immediately upon being contacted with such catalyst compositions. Examples of other polymerizable hydrocarbons which can be used in the process of this invention are propylene, 1-butene, 1-hexene, and 1-octene. Branched chain olefins can also be used, such as isobutylene, as well as 1,1-dialkyl-substituted ethylenes. Examples of the di- and polyolefins in which the double bonds are in non-conjugated positions and which can be used in accordance with this invention are 1,5-hexatriene, 1,4-pentadiene and 1,4,7-octatriene. Mixtures of the foregoing polymerizable hydrocarbons can be polymerized to a solid polymer in the presence of the described catalysts, as, for example, by copolymerizing ethylene and propylene, ethylene and 1-butene, propylene and 1-butene, or propylene and a pentene. Also aryl olefins, e. g., styrene and alkyl-substituted styrenes can be polymerized to a solid polymer in the process of this invention.

This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene and the like. It is also within the scope of the invention to polymerize such conjugated dienes either alone or in admixture with each other and/or with one or more other compounds containing an active $CH_2=<$ group which are copolymerizable therewith. Examples of such monoolefins are listed above. Examples of other compounds containing the active $CH_2=C<$ group include styrene, acrylonitrile, methyl acrylate, methyl methacrylate, vinyl chloride, 2-methyl-5-vinylpyridine, 2-vinylpyridine, etc.

Suitable solvents for use in the polymerization process are paraffins, cycloparaffins and/or aromatic hydrocarbons which are relatively inert, non-deleterious and liquid under the conditions of the process. The lower molecular weight alkanes, such as propane, butane, and pentane are especially useful when the process is carried out at low temperatures. However, the higher molecular weight paraffins and cycloparaffins, such as isooctane, cyclohexane, methylcyclohexane, and aromatic diluents, such as benzene, toluene, and the like, can also be used, particularly when operating at higher temperatures. When the process of the instant invention is used to treat the reaction mixture recovered from the polymerization process directly, it is preferred that the solvent used in the process be one of the aforementioned higher molecular weight materials, e. g., a hydrocarbon containing at least 6 carbon atoms per molecule.

A more comprehensive understanding of the invention can be obtained by referring to the following illustrative example which is not intended, however, to be unduly limitative of the invention.

EXAMPLE

Ethylene was polymerized in the presence of a catalyst consisting of titanium tetrachloride and triisobutylaluminum. The reactor was initially charged with 2 liters of cyclohexane after treatment thereof with silica gel and alumina in order to remove any moisture. Thereafter, 1.94 grams of triisobutylaluminum and 0.56 gram of titanium tetrachloride were added to the reactor. The reactor was flushed with nitrogen prior to and during the charging procedure to prevent contact of the reactant materials with air or moisture. The ethylene feed was passed through a purification system to remove oxygen, carbon dioxide and water prior to entering the reactor. The purification system comprised an alkaline pyrogallol solution and a drying agent (silica-alumina). Ethylene was added to the reactor at a rate such as to maintain a pressure of about 300 p. s. i. g. The temperature in the reactor during the polymerization was about 200° F. At the end of about three hours, the reaction mixture was heated to 250° F., blown into 4 liters of cyclohexane, and cooled overnight.

A four percent polyethylene slurry in cyclohexane, prepared as described above, was treated in order to remove catalyst contained therein. The apparatus (bomb) used comprised a 17-inch long section of 1½-inch stainless steel, capped pipe connected by a Jamesbury valve (a full opening valve) to a 2-inch long capped section of the same type of pipe. About 202.1 grams of polyethylene slurry and 131 grams of butane were added to the bomb, constructed as described, thereby making a 39.1 weight percent butane in polymer-cyclohexane slurry. The bomb was then placed upright in an oven maintained at a temperature between 300 and 308° F. with the short section of pipe below the Jamesbury valve being in the down position. At the end of 1½ hours, the Jamesbury valve was closed, the bomb cooled, and two separate slurry samples recovered, one from above and one from below the valve. These samples were placed in glass bombs with 5 cc. of isopropyl alcohol and warmed with the bomb valves open to allow the butane to evaporate. The valves of the glass bombs were then closed, and the bombs were placed in an oven maintained at a temperature of about 180° F. for a period sufficient for the polymer to enter solution. This procedure allowed the isopropyl alcohol to deactivate any catalyst contained in the solution. The bombs were then cooled, after which the polymer was removed for melt index and ash content determinations. The results of these tests are set forth hereinbelow in the table.

*Table*

| Sample | Melt Index | Color of Polymer | Wt. Percent Ash | Color of Ash |
|---|---|---|---|---|
| From top of Stainless Steel bomb—Polymer rich phase. | 1.60 | white | 0.05 | yellow brown. |
| From bottom of Stainless Steel bomb—Catalyst rich phase. | 0.04 | yellow | 1.35 | white. |
| Original untreated sample | 0.06 | gray | 0.42 | white. |

From the foregoing data, it is seen that by proceeding in accordance with the instant invention, a polymer product having a low ash content is obtained.

The polymers and copolymers produced in accordance with this invention have utility in applications where solid plastics are used. They are especially useful in applications requiring polymers of low ash content and polymers having a desirable white color which is retained even after the polymer is subjected to a molding operation. As will be evident to those skilled in the art, many variations and modifications of the invention can be made from a study of the foregoing disclosure. Such variations and modifications are believed to be clearly within the spirit and scope of the invention.

I claim:

1. The process of treating a polymer prepared by catalytic polymerization in the presence of a catalyst selected from the group consisting of (1) a compound of a metal selected from the group consisting of aluminum, indium, and beryllium having the valence linkages thereof individually bound to members selected from the group consisting of hydrogen, alkyl, cycloalkyl, and aryl radicals, and (2) mixtures having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a hydrocarbon solvent, said solution containing said catalyst as an impurity, with a light paraffinic hydrocarbon containing from 1 to 6, inclusive, carbon atoms per molecule and having a boiling point lower than that of said hydrocarbon solvent; and separately recovering a polymer rich phase and a catalyst rich phase.

2. The process of claim 1 wherein said catalyst comprises triethylaluminum and titanium tetrachloride.

3. The process of claim 1 wherein said catalyst comprises triisobutylaluminum and titanium tetrachloride.

4. The process of claim 1 wherein said catalyst comprises ethylaluminum dichloride, diethylaluminum chloride and titanium tetrachloride.

5. The process of claim 1 wherein said catalyst comprises titanium tetrachloride, ethyl bromide and sodium.

6. The process of claim 1 wherein said catalyst comprises titanium tetrachloride and elemental aluminum.

7. The process of treating a polymer prepared by catalytic polymerization in the presence of a catalyst selected from the group consisting of (1) a compound of a metal selected from the group consisting of aluminum, gallium, indium, and beryllium having the valence linkages thereof individually bound to members selected from the group consisting of hydrogen, alkyl, cycloalkyl, and aryl radicals, and (2) mixtures having at least two essential components, one of said components being a metal compound selected from the group consisting of group IV, group V and group VI metal compounds, and another of said components being selected from the group consisting of organometal compounds, metal hydrides, and metals of groups I, II and III which comprises countercurrently contacting a solution of said polymer in a hydrocarbon solvent, said solution containing said catalyst as an impurity, with a light paraffinic hydrocarbon containing from 1 to 6, inclusive, carbon atoms per molecule and having a lower boiling point than that of said hydrocarbon solvent; forming a polymer rich phase and a catalyst rich phase; and separately recovering said polymer rich phase and said catalyst rich phase.

8. The process of treating a polymer of ethylene, prepared by catalytic polymerization in the presence of a catalyst selected from the group consisting of (1) a compound of a metal selected from the group consisting of aluminum, gallium, indium, and beryllium having the valence linkages thereof individually bound to members selected from the group consisting of hydrogen, alkyl, cycloalkyl, and aryl radicals, and (2) mixtures having at least two essential components, one of said components being a metal compound selected from the group consisting of group IV, group V and group VI metal compounds, and another of said components being selected from the group consisting of organo-metal compounds, metal hydrides, and metals of groups I, II and III which comprises countercurrently contacting a solution of said polymer in a hydrocarbon solvent, said solution containing said catalyst as an impurity, with a light hydrocarbon having a lower boiling point than that of said hydrocarbon solvent, said contacting occurring at a temperature of at least 180° F.; forming a polymer rich phase and a catalyst rich phase; and separately recovering said polymer rich phase and said catalyst rich phase.

9. The process of claim 8 wherein said light hydrocarbon has a boiling point at least about 25° F. lower than the boiling point of said hydrocarbon solvent.

10. The process of claim 9 wherein said hydrocarbon solvent is cyclohexane and said light hydrocarbon is normal butane.

11. The process of treating a polymer prepared by catalytic polymerization in the presence of a catalyst selected from the group consisting of (1) a compound of a metal selected from the group consisting of aluminum, gallium, indium, and beryllium having the valence linkages thereof individually bound to members selected from the group consisting of hydrogen, alkyl, cycloalkyl, and aryl radicals, and (2) mixtures having at least two essential components, one of said components being a metal compound selected from the group consisting of group IV, group V and group VI metal compounds, and another of said components being selected from the group consisting of organometal compounds, metal hydrides, and metals of groups I, II and III which comprises introducing a solution of said polymer in a hydrocarbon solvent, said solution containing said catalyst as an impurity, into an intermediate portion of an elongated contacting zone; introducing a light paraffinic hydrocarbon containing from 1 to 6, inclusive carbon atoms per molecule and having a boiling point lower than that of said hydrocarbon solvent into a lower portion of said contacting zone; maintaining the upper portion of said contacting zone at a temperature higher than that within the lower portion of said zone; withdrawing a polymer rich phase from the upper portion of said contacting zone; and withdrawing a catalyst rich phase from the lower portion of said contacting zone.

12. The process of claim 11 wherein said polymer is polyethylene and the temperature within said contacting zone is at least 180° F.

13. A process for producing a polyethylene having a low ash content which comprises treating a solution of polyethylene in a hydrocarbon solvent with a light paraffinic hydrocarbon containing from 1 to 6, inclusive, carbon atoms per molecule and having a boiling point lower than that of said hydrocarbon solvent, said polyethylene having been prepared by catalytic polymerization in the presence of a catalyst selected from the group consisting of (1) a compound of a metal selected from the group consisting of aluminum, gallium, indium, and beryllium having the valence linkages thereof individually bound to members selected from the group consisting of hydrogen, alkyl, cycloalkyl, and aryl radicals, and (2) mixtures having at least two essential components, one of said components being a group IV to VI metal compound and another of said components being selected from the group consisting of organometal compounds, metal hydrides, and metals of groups I, II and III.

14. In a method for polymerizing polymerizable hydrocarbons comprising contacting in a reaction zone in the presence of a hydrocarbon solvent at least one polymerizable hydrocarbon with a catalyst having at least two essential components, one of said components being a metal compound selected from the group consisting of group IV, group V and group VI metal compounds, and another of said components being selected from the group consisting of organometal compounds, metal hydrides and metals of groups I, II and III, and recovering from said reaction zone a solution of polymer in said hydrocarbon solvents, said solution containing said catalyst as an impurity, the improvement which comprises contacting said recovered solution with a light hydrocarbon having a lower boiling point than that of said hydrocarbon solvent; forming a polymer rich phase and a catalyst rich phase comprising said light hydrocarbon, said catalyst and polymer; separately recovering said polymer rich phase and said catalyst rich phase; separating said light hydrocarbon from said catalyst rich phase; and recycling said catalyst rich phase free of said light hydrocarbon to said reaction zone.

15. The process of treating a polymer prepared by catalytic polymerization in the presence of a catalyst selected from the group consisting of (1) a compound of a metal selected from the group consisting of aluminum, gallium, indium and beryllium having the valence linkages thereof individually bound to members selected from the group consisting of hydrogen, alkyl, cycloalkyl and aryl radicals, and (2) mixtures obtained by mixing at least two essential components, one of said components being a metal compound selected from the group consisting of group IV, group V, and group VI metal compounds, and another of said components being selected from the group consisting of organometal compounds, metal hydrides, and metals of groups I, II and III, which comprises contacting a solution of said polymer in a hydrocarbon solvent, said solution containing catalyst as an impurity with a light paraffinic hydrocarbon containing from 2 to 5, inclusive, carbon atoms per molecule and having a boiling point lower than that of said hydrocarbon solvent, the volume of said light paraffinic hydrocarbon used in said contacting being sufficient to form a separate phase rich in catalyst, said contacting occurring at a temperature in the range of 150 to 500° F. and at a pressure sufficient to maintain said light paraffinic hydrocarbon in the liquid phase; and separating a polymer rich phase from a catalyst rich phase.

16. The process of treating a polymer prepared by catalytic polymerization in the presence of a catalyst selected from the group consisting of (1) a compound of a metal selected from the group consisting of aluminum, gallium, indium and beryllium having the valence linkages thereof individually bound to members selected from the group consisting of hydrogen, alkyl, cycloalkyl and aryl radicals, and (2) mixtures obtained by mixing at least two essential components, one of said components being a metal compound selected from the group consisting of group IV, group V, and group VI metal compounds, and another of said components being selected from the group consisting of organometal compounds, metal hydrides, and metals of groups I, II and III, which comprises contacting a solution of said polymer in a hydrocarbon solvent, liquid at polymerization conditions and being selected from the group consisting of paraffinic, cycloparaffinic and aromatic hydrocarbons containing at least 6 carbon atoms per molecule, said solution containing catalyst as an impurity, with a light paraffinic hydrocarbon selected from the group consisting of propane and butanes, said light paraffinic hydrocarbon having a boiling point lower than that of said hydrocarbon solvent, the amount of said light paraffinic hydrocarbon used in said contacting being up to 10 volumes of light hydrocarbon per volume of polymer solution and sufficient to form a separate phase rich in catalyst, said contacting occurring at a temperature in the range of 150 to 500° F. and at a pressure sufficient to maintain said light paraffinic hydrocarbon in the liquid phase; and separating a polymer rich phase from a catalyst rich phase.

17. The process of treating a polymer prepared by catalytic polymerization in the presence of a catalyst selected from the group consisting of (1) a compound of a metal selected from the group consisting of aluminum, gallium, indium and beryllium having the valence linkages thereof individually bound to members selected from the group consisting of hydrogen, alkyl, cycloalkyl and aryl radicals, and (2) mixtures obtained by mixing at least two essential components, one of said components being a metal compound selected from the group consisting of group IV, group V, and group VI metal compounds, and another of said components being selected from the group consisting of organometal compounds, metal hydrides, and metals of groups I, II and III, which comprises countercurrently contacting in an elongated contacting zone a solution of said polymer in a hydrocarbon solvent, liquid at polymerization conditions and being selected from the group consisting of paraffinic, cycloparaffinic and aromatic hydrocarbons containing at least 6 carbon atoms per molecule, said solution containing catalyst as an impurity, with a light paraffinic hydrocarbon selected from the group consisting of propane and butanes, said light paraffinic hydrocarbon having a boiling point lower than that of said hydrocarbon solvent, the amount of said light paraffinic hydrocarbon used in said contacting being up to 10 volumes of light hydrocarbon per volume of polymer solution and sufficient to form a separate phase rich in catalyst, said contacting occurring at a temperature in the range of 150 to 500° F. and at a pressure sufficient to maintain said light paraffinic hydrocarbon in the liquid phase, and the upper portion of said contacting zone being maintained at a temperature from 50 to 100° F. higher than the lower portion of said zone; and separating a polymer rich phase from a catalyst rich phase.

18. The process of treating a polymer of ethylene prepared by catalytic polymerization in the presence of a catalyst selected from the group consisting of (1) a compound of a metal selected from the group consisting of aluminum, gallium, indium and beryllium having the valence linkages thereof individually bound to members selected from the group consisting of hydrogen, alkyl, cycloalkyl and aryl radicals, and (2) mixtures obtained by mixing at least two essential components, one of said components being a metal compound selected from the group consisting of group IV, group V, and group VI metal compounds, and another of said components being selected from the group consisting of organometal compounds, metal hydrides, and metals of groups I, II and III, which comprises contacting a solution of said polymer of ethylene in cyclohexane, said solution containing catalyst as an impurity, with butane, the amount of butane used in said contacting being up to 10 volumes of butane per volume of polymer solution and sufficient to form a separate phase rich in catalyst, said contacting occurring at a temperature in the range of 150 to 500° F. and at a pressure sufficient to maintain said butane in the liquid phase; and separating a polymer rich phase from a catalyst rich phase.

19. The process of treating a polymer of ethylene prepared by catalytic polymerization in the presence of a catalyst selected from the group consisting of (1) a compound of a metal selected from the group consisting of aluminum, gallium, indium and beryllium having the valence linkages thereof individually bound to members selected from the group consisting of hydrogen, alkyl, cycloalkyl and aryl radicals, and (2) mixtures obtained by mixing at least two essential components, one of said components being a metal compound selected from the group consisting of group IV, group V, and group VI metal compounds, and another of said components being selected from the group consisting of organometal compounds, metal hydrides, and metals of groups I, II and III, which comprises contacting a solution of said polymer of ethylene in cyclohexane, said solution containing catalyst as an impurity, with propane, the amount of propane used in said contacting being up to 10 volumes of propane per volume of polymer solution and sufficient to form a separate phase rich in catalyst, said contacting occurring at a temperature in the range of 150 to 500° F. and at a pressure sufficient to maintain said propane in the liquid phase; and separating a polymer rich phase from a catalyst rich phase.

20. A process of treating a polymer of ethylene prepared by catalytic polymerization in the presence of a catalyst obtained by mixing triisobutylaluminum and titanium tetrachloride which comprises contacting a solution of said polymer of ethylene in cyclohexane, said solution containing catalyst, with butane, the amount of butane used in said contacting being up to 10 volumes of butane per volume of polymer solution and sufficient to form a separate phase rich in catalyst, said contacting occurring at a temperature in the range of 150 to 500° F. and at a pressure sufficient to maintain said butane in the liquid phase; and separating a polymer rich phase from a catalyst rich phase.

References Cited in the file of this patent

UNITED STATES PATENTS

| 2,405,547 | Gaylor | Oct. 5, 1948 |
| 2,691,008 | Grim | Oct. 5, 1954 |
| 2,731,453 | Field et al. | Jan. 17, 1956 |

FOREIGN PATENTS

| 874,215 | Germany | Apr. 20, 1953 |
| 538,782 | Belgium | Dec. 6, 1955 |